United States Patent [19]

Zannucci et al.

[11] 4,340,718

[45] Jul. 20, 1982

[54] STABILIZED COPOLYESTER MATERIAL

[75] Inventors: Joseph S. Zannucci; Bobby J. Sublett; Gether Irick, Jr., all of Kingsport, Tenn.

[73] Assignee: Eastman Kodak Company, Rochester, N.Y.

[21] Appl. No.: 155,811

[22] Filed: Jun. 2, 1980

[51] Int. Cl.³ .................... C08G 63/60; C08G 63/54; C08G 63/68

[52] U.S. Cl. .................... 528/128; 528/192; 528/208; 528/292; 528/304

[58] Field of Search .............. 528/128, 192, 208, 292, 528/304

[56] References Cited

U.S. PATENT DOCUMENTS

| | | | |
|---|---|---|---|
| 3,706,701 | 12/1972 | Susi | 260/45.85 V |
| 4,230,817 | 10/1980 | Charbonneau | 528/206 |
| 4,260,719 | 4/1981 | Ching | 528/196 |
| 4,260,732 | 4/1981 | Ching | 528/192 |

*Primary Examiner*—Earl A. Nielsen
*Attorney, Agent, or Firm*—Donald W. Spurrell; Daniel B. Reece, III

[57] ABSTRACT

Disclosed are novel copolyester materials having improved weatherability and useful, for example, as films, fibers, sheeting and the like in outdoor applications where long and daily exposure to actinic radiation is encountered. These copolyesters comprise, for example, polyethylene terephthalate containing a total of from about 0.3 to about 5.0%, preferably from about 0.6 to about 2.0% by weight of one or more moieties having the formula

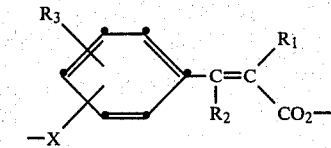

where $R_1$ is cyano, alkylcarbonyl, cycloalkylcarbonyl or arylcarbonyl; $R_2$ and $R_3$ are, for example, alkyl, cycloalkyl, or aryl which may be substituted with a large variety of groups; and —X— is ortho, meta, or para to the -ylene linkage and is selected from groups of the formulae

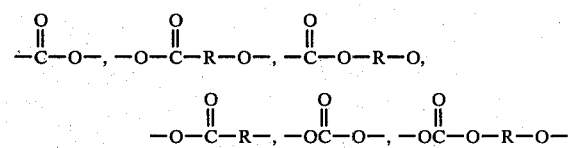

wherein R is alkylene of 1–10 carbons, aryl, or cycloalkyl, each of which may be substituted.

4 Claims, No Drawings

STABILIZED COPOLYESTER MATERIAL

This invention concerns improving the weatherability of polyester materials to be used, for example, as films, fibers, sheeting and the like in outdoor applications where long and daily exposure to actinic radiation is encountered.

On exposure to sunlight for extended periods of time polyester compositions degrade and lose the physical properties critical to their utility as structural molding plastics and the like. Considerable effort has been directed toward this photodegradation problem and many additives and stabilizers have been developed which improve the weatherability of polyester formulations to varying degrees. For many polyesters, however, these stabilizers do not impart the degree of weatherability that is desired for the more demanding applications, and also many of these stabilizers are fugitive and are lost during processing such as during extrusion and also through the weathering process itself.

Two stabilizers which have proven effective up to a point are the dimethyl and diethyl esters of p-methoxybenzylidenemalonic acid which are used in admixture with polymeric materials as disclosed in U.S. Pat. No. 3,706,701. Such stabilizers have been employed with a number of types of polyesters but do not exhibit sufficient weatherability for use in extended outdoor exposure even at stabilizer loadings as high as 2% by weight of the polyester.

In accordance with the present invention it has been discovered that polyesters containing certain copolymerized stabilizer moieties somewhat similar in structure to those of the aforesaid patent, as either monofunctional terminal ester forming groups or as difunctional comonomers are very weatherable and are useful formulations for prolonged outdoor exposure. These polyesters can be used for the production of weatherable fibers, films, oriented films, sheeting, molded articles and the like.

The copolymerizable moieties have the general formula

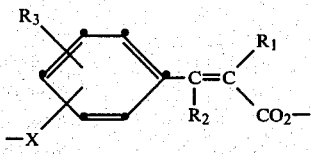

where $R_1$ is cyano, alkylcarbonyl, cycloalkylcarbonyl or arylcarbonyl; $R_2$ is alkyl, cycloalkyl, or aryl; $R_3$ represents 1–4 groups each independently selected from H, Cl, F, alkyl, cycloalkyl, alkoxy, aryl or aryloxy; wherein all of the above alkyl and alkylene moieties comprising or being part of the $R_1$, $R_2$ and $R_3$ groups contain from 1–8 carbons; —X— is ortho, meta, or para to the -ylene linkage and is selected from groups of the formulae

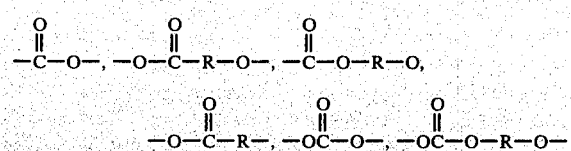

wherein R is alkylene of 1–10 carbons, arylene, or cycloalkylene; and wherein all of the alkyl, alkylene, arylene and cycloalkylene groups throughout this specification may be substituted with up to three substituents which do not interfere with the copolymerization or adversely effect the chemical or physical properties of the polyester, including substituents such as halogen, alkyl of 1–8 carbons, alkoxy of 1–8 carbons, aryl, cycloalkyl, CN, and the like.

Preferred stabilizing moieties useful in this invention have the formulae:

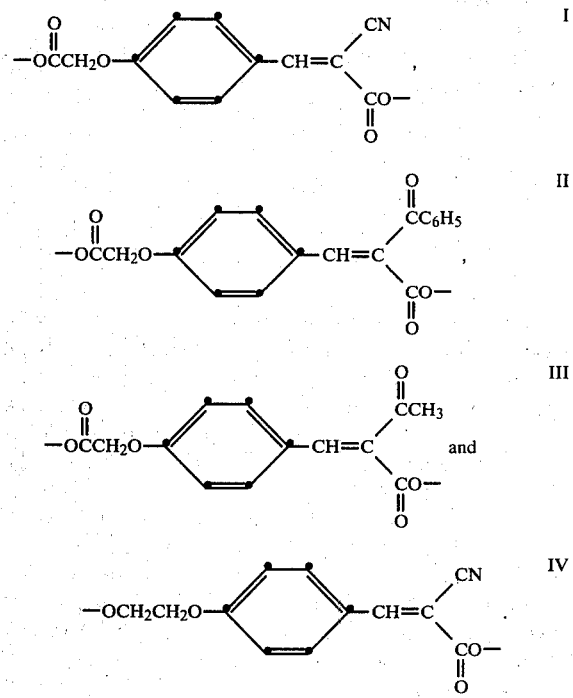

The polyesters into which the present stabilizer moieties are incorporated are prepared by reaction conditions well known in the art. These polyesters may be homopolyesters or copolyesters prepared by reacting a dibasic acid (or ester) or mixtures thereof with aliphatic glycols or glycol mixtures as disclosed, for example, in U.S. Pat. No. 3,779,993 at Column 3. Such dibasic acids are, for example: terephthalic, isophthalic, p,p'-sulfonyldibenzoic, 1,2- or 1,3- or 1,4-cyclohexanedicarboxylic, 1,4- or 1,5- or 2,7- or 2,6-naphthalenedicarboxylic, 4,4'-diphenic, 4,4'-benzophenonedicarboxylic, and the like. The glycols are, for example, polymethylene glycols containing 2 to 10 carbon atoms such as ethylene glycol, 1,2- or 1,3-propanediol, 1,2- or 1,3- or 1,4-cyclohexanedimethanol, neopentyl glycol, 1,5- or 2,4-pentanediol, 1,6- or 2,5-hexanediol, 1,3- or 2,3- or 1,4-butanediol, 2,2,4,4-tetramethylcyclobutane-1,3-diol and the like. Also, modifying amounts, i.e., up to about 40 mole % of various acids such as p-hydroxybenzoic, adipic, and sebacic, and ether glycols such as diethylene glycol, poly(ethylene glycol), poly(propylene glycol), and poly(butylene glycol) may be added. Such polyesters may be amorphous or crystalline, they must be able to be formed into films, sheets, or molded objects, preferably have an ASTM (D648-56) 264 psi heat deflection temperature of >60° C., and have an inherent viscosity of at least about 0.4 and preferably between about 0.4 and about 1.6 when measured at 25° C. using 0.5 grams of polymer per 100 milliliter of a solvent consisting of 60 volumes of phenol and 40 volumes of tetrachloroethane. Preferred such polyester moldable compositions are, for example, predominantly poly(ethylene terephthalate), poly(tetramethylene terephthalate), poly(1,4-cyclohexylenedimethylene terephthalate), and the like.

A typical copolyester preparation in which the stabilizer is copolymerized into the polymer chain is carried out as follows: ninety four and seventy nine hundreths grams (0.4886 moles) of dimethyl terephthalate, 87.0 grams (1.4 moles) of ethylene glycol, 10.49 g (0.0729 moles) of 1,4-cyclohexanedimethanol, 1.1 g (0.0044 moles) of the compound

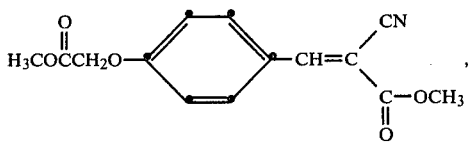

1 ml of n-butanol solution of titanium tetraisopropoxide which is 0.75% titanium, and 1 ml of an ethylene glycol solution containing 1.1% by weight of commercial Zonyl A, were weighed into a 500 ml single-neck round-bottom flask equipped with a nitrogen inlet, a stirrer, a vacuum outlet and a condensing flask. The flask was heated at 200° C. in a metal bath for 3 hrs. with a nitrogen sweep over the reaction mixture. When the theoretical amount of methanol had distilled from the reaction mixture the metal bath temperature was increased to 280° C. and the pressure in the flask reduced to 0.5 mm of Hg for 1 hr. and 15 minutes. The flask was then removed from the metal bath and allowed to cool to room temperature under reduced pressure. The inherent viscosity of this polymer was about 0.76.

In the present copolyesters the total weight of one or more of the stabilizer moieties should be between about 0.3 and 5.0% by weight of total polyester per se, and preferably between about 0.6 and about 2.0%. The polyester composition may contain the usual additives, fillers, pigments and the like such as $TiO_2$, carbon black and talc.

The following Table 1 shows the effects of several commercial stabilizers on the weatherability of polyester material. Table 2 shows the large improvements in weatherability obtained by the present invention over most of the commercial stabilizers. In the tables, the flatwise impact strengths we obtained are according to ASTM D256 Method A. The flatwise impact strengths of unstabilized Copolymers A and B were actually less than 1.0 but 1.0 was used to calculate the improved impact strengths.

TABLE 1

Photostability[1] of Poly(65/35 molar-1,4-cyclohexylenedimethylene/ethylene terephthalate) Formulations Containing the Following Selected Commercial Stabilizers Numbered 1–10

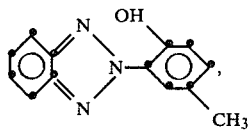

TABLE 1-continued

Photostability[1] of Poly(65/35 molar-1,4-cyclohexylenedimethylene/ethylene terephthalate) Formulations Containing the Following Selected Commercial Stabilizers Numbered 1–10

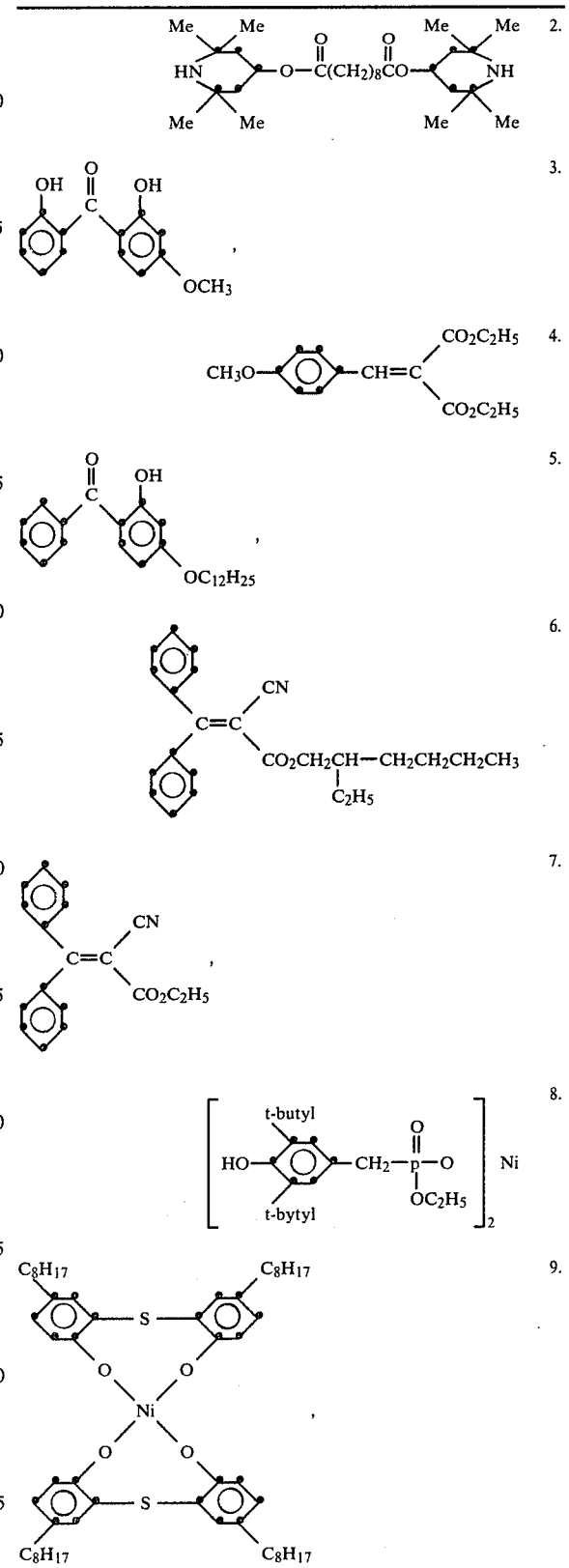

TABLE 1-continued

Photostability[1] of Poly(65/35 molar-1,4-cyclohexylenedimethylene/ethylene terephthalate) Formulations Containing the Following Selected Commercial Stabilizers Numbered 1-10

10.  
$$\text{OC}_2\text{H}_5-\text{C}_6\text{H}_4-\text{NH-CO-CO-NH-}\text{C}_6\text{H}_4-\text{C}_2\text{H}_5 \text{ (t-butyl)}$$

| Stabilizer (1% w/w) | Flatwise Impact Strength Hours Exposed | |
|---|---|---|
| | 0 | 500 |
| 1 | 16 | 4 |
| 2 | 16 | 1 |
| 3 | 16 | 2 |
| 4 | 16 | 5 |
| 5 | 16 | 1 |
| 6 | 16 | 1 |
| 7 | 16 | 1 |
| 8 | 16 | 1 |
| 9 | 16 | 1 |
| 10 | 16 | 4 |
| Control (No Stabilizer) | 16 | <1 |

[1] Samples weathered in the Atlas XWR Weather-Ometer.

TABLE 2

Photostability[1] of Selected Copolyesters[2] Containing Stabilizing Moieties

| Composition | Improvement Factor After 500 Hours Exposure[3] |
|---|---|
| Copolymer A containing 1.0% moiety I | >7 |
| Copolymer A containing 1.0% moiety II | >7 |
| Copolymer A containing 1.0% moiety III | >6 |
| Copolymer A containing 1.0% moiety IV | >7 |
| Copolymer B containing 1.0% moiety I | >7 |
| Copolymer B containing 1.0% moiety II | >6 |

[1] Samples weathered in the Atlas XWR Weather-Ometer.
[2] Copolymer A = poly(69/31 molar ethylene/1,4-cyclohexylenedimethylene terephthalate). Copolymer B = poly(65/35 molar 1,4-cyclohexylenedimethylene/ethylene terephthalate).
[3] Improvement factor = flatwise impact strength of polymer containing stabilizer moiety divided by flatwise impact strength of unstabilized polymer.

The following table gives further specific examples of stabilizing moieties useful in the present invention.

$$\text{X-C}_6\text{H}_3(R_3)\text{-C}(R_2)=C(R_1)(CO_2-)$$

| $R_1$ | $R_2$ | $R_3$ | $-X-$ |
|---|---|---|---|
| $-COC_6H_{11}$ | $-CH_3$ | 2-Cl | $-\overset{O}{\underset{\|}{C}}-O-$ |
| $-COCH_2Cl$ | H | 3-$OCH_3$ | $-\overset{O}{\underset{\|}{C}}-O-$ |
| $-CN$ | $-C_6H_{11}$ | H | $-O-\overset{O}{\underset{\|}{C}}-O_2H_4-O-$ |
| $-COC_2H_5$ | $-C_6H_5$ | H | $-\overset{O}{\underset{\|}{C}}-O-CH_2-O-$ |
| $-COCH_2CH_2CH_3$ | H | 2,6-di-$CH_3$ | $-O-\overset{O}{\underset{\|}{C}}-CH_2-$ |
| $-COCH_3$ | H | 2-$OC_6H_5$ | $-O-\overset{O}{\underset{\|}{C}}-O-$ |
| $-COCH_3$ | H | H | $-O-\overset{O}{\underset{\|}{C}}-O-CH_2-O-$ |
| $-COCH_2CH_2Cl$ | $-CH_3$ | H | $O-\overset{O}{\underset{\|}{C}}-CH_2-O-$ |
| $-COCH_2OC_2H_5$ | $-CH_3$ | H | $O-\overset{O}{\underset{\|}{C}}-CH_2-O-$ |
| $-CN$ | $-CH_2CH_2Cl$ | 2-$CH_2OC_2H_5$ | $O-\overset{O}{\underset{\|}{C}}-CH_2-O-$ |

-continued

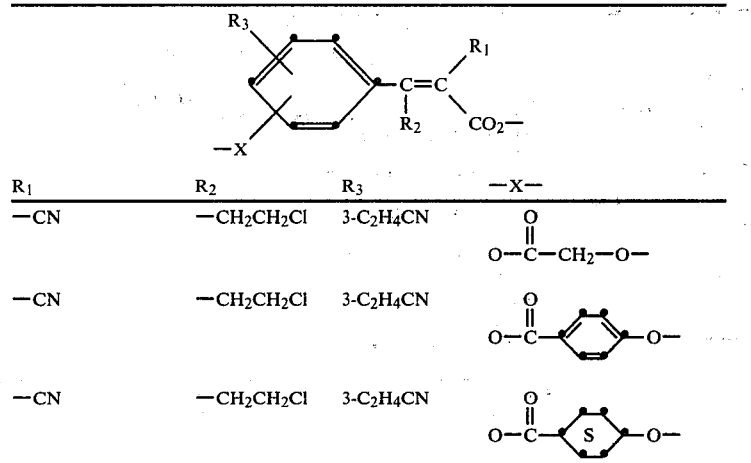

| $R_1$ | $R_2$ | $R_3$ | —X— |
|---|---|---|---|
| —CN | —CH$_2$CH$_2$Cl | 3-C$_2$H$_4$CN | O–$\overset{\overset{O}{\|}}{C}$–CH$_2$–O– |
| —CN | —CH$_2$CH$_2$Cl | 3-C$_2$H$_4$CN | O–$\overset{\overset{O}{\|}}{C}$–⟨benzene⟩–O– |
| —CN | —CH$_2$CH$_2$Cl | 3-C$_2$H$_4$CN | O–$\overset{\overset{O}{\|}}{C}$–⟨thiophene-S⟩–O– |

The invention has been described in detail with particular reference to preferred embodiments thereof, but it will be understood that variations and modifications can be effected within the spirit and scope of the invention.

We claim:

1. A copolyester having an inherent viscosity of at least 0.4 and containing in copolymerized form from about 0.3 to about 5.0% by weight of one or more of the stabilizing moieties having the general formula

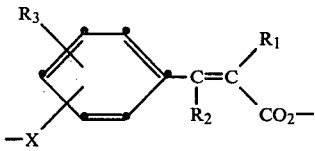

where $R_1$ is cyano, alkylcarbonyl, cycloalkylcarbonyl or arylcarbonyl; $R_2$ is alkyl, cycloalkyl, or aryl; $R_3$ represents 1–4 groups each independently selected from H, Cl, F, alkyl, cycloalkyl, alkoxy, aryl or aryloxy; wherein all of the above alkyl and alkylene moieties comprising or being part of the $R_1$, $R_2$ and $R_3$ groups contain from 1–8 carbons; —X— is ortho, meta, or para to the -ylene linkage and is selected from groups of the formulae

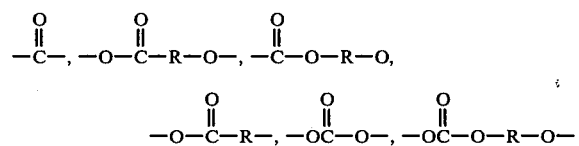

wherein R is alkylene of 1–10 carbons, arylene, or cycloalkylene; and wherein all of the above alkyl, alkylene, arylene and cycloalkylene groups may be substituted with up to three substituents selected from halogen, alkyl of 1–8 carbons, alkoxy of 1–8 carbons, aryl, cycloalkyl and CN.

2. The copolyester according to claim 1 wherein the stabilizing moiety is selected from those of the formulae:

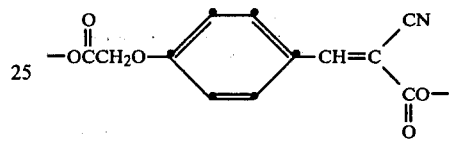

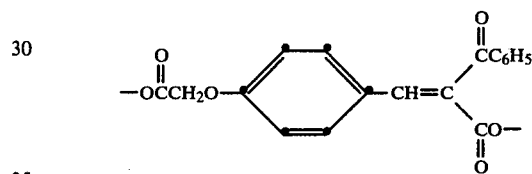

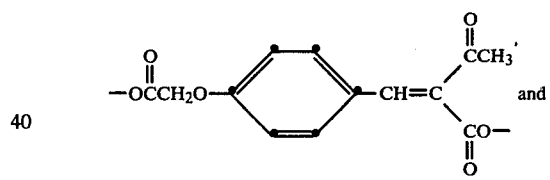

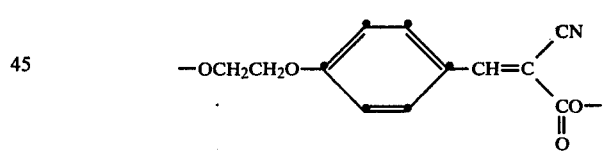

3. The copolyester according to claim 2 wherein the dibasic acid is selected from one or both of terephthalic and 1,2-, 1,3- or 1,4-cyclohexanedicarboxylic, and may include up to about 40 mole % of a modifying acid such as adipic, sebacic, p,p'-sulfonyldibenzoic, p-hydroxybenzoic, 1,4-, 1,5-, 2,7- or 2,6-naphthalenedicarboxylic, 4,4'-diphenic or 4,4'-benzophenonedicarboxylic and the glycols are selected from one or more of ethylene glycol, 1,2- or 1,3-propanediol, 1,2- or 1,3- or 1,4-cyclohexanedimethanol, neopentyl glycol, 1,5- or 2,4-pentanediol, 1,6- or 2,5-hexanediol, 1,3-, 2,3- or 1,4-butanediol and 2,2,4,4-tetramethylcyclobutane-1,3-diol and may contain up to about 40 mole % of one or more diethylene glycol, poly(ethylene glycol), poly(propylene glycol), and poly(butylene glycol).

4. The copolyester of claim 3 wherein the principal polyester comprises in a molar ratio of from about 4/1 to about 1/4, ethylene/1,4-cyclohexylenedimethylene terephthalate.

* * * * *